July 31, 1962 R. E. PRICE 3,046,706
AUTOMATIC PLUNGE GRINDER
Filed March 25, 1960 4 Sheets-Sheet 1

INVENTOR
RALPH E. PRICE
BY
ATTORNEY

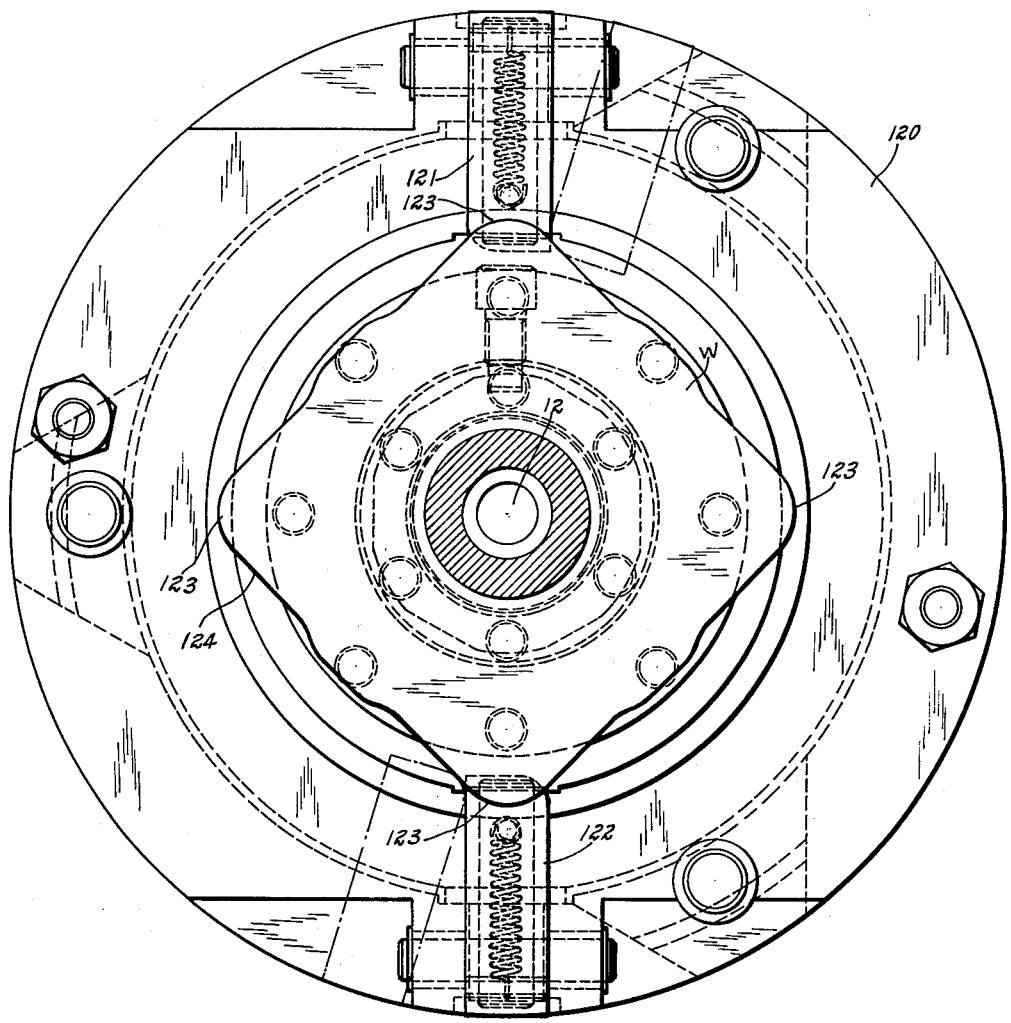

July 31, 1962 R. E. PRICE 3,046,706
AUTOMATIC PLUNGE GRINDER
Filed March 25, 1960 4 Sheets-Sheet 3
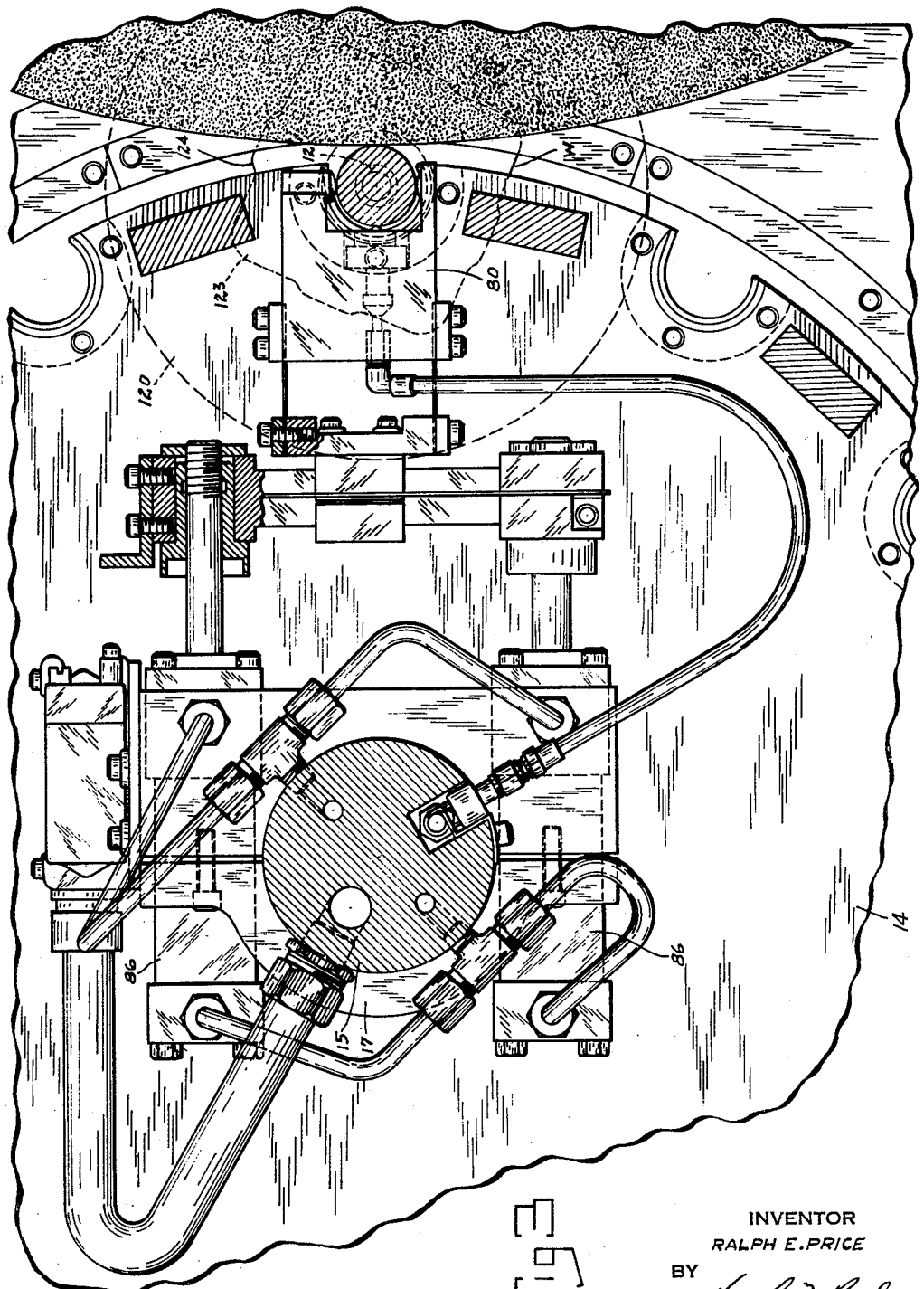
INVENTOR
RALPH E. PRICE
BY
ATTORNEY

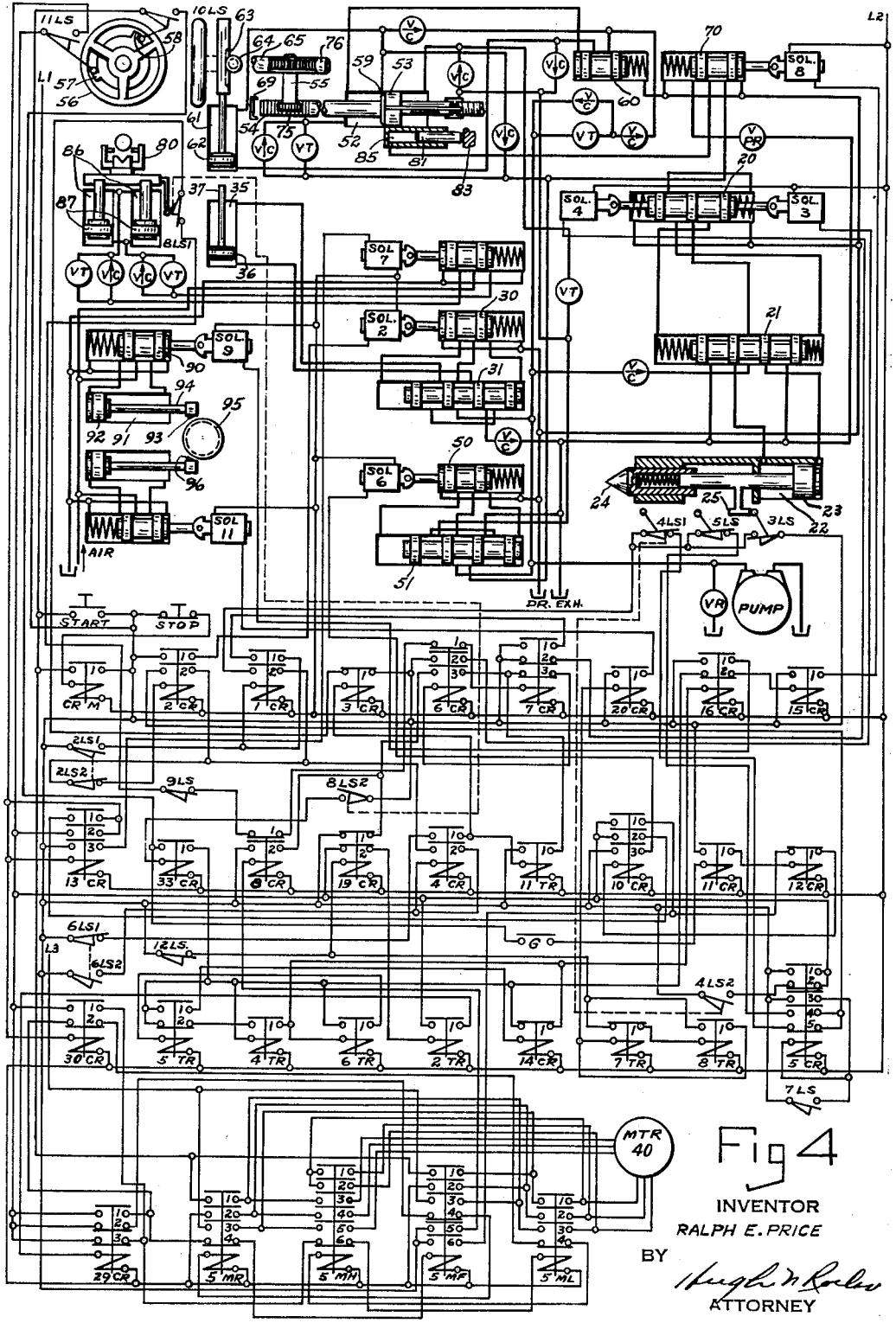

United States Patent Office 3,046,706
Patented July 31, 1962

3,046,706
AUTOMATIC PLUNGE GRINDER
Ralph E. Price, Waynesboro, Pa., assignor to Landis Tool Company, Waynesboro, Pa.
Filed Mar. 25, 1960, Ser. No. 17,596
23 Claims. (Cl. 51—165)

This invention relates to a grinding machine, particularly a machine designed specifically for infeed or plunge grinding.

It is, therefore, an object of the present invention to provide a machine in which the headstock and footstock, work carrier and wheel feed are actuated automatically in predetermined sequence.

Another object is to provide a machine in which footstock actuated control members are arranged to accommodate workpieces in two length ranges.

Another object is to provide means whereby the rapid feed of the grinding wheel cannot occur unless the workpiece is properly indexed, supported by the headstock and footstock centers, and is being rotated by the work drive motor.

Another object is to provide means whereby the drop in exhaust pressure at the end of the rapid feed movement is used to start the slow feed mechanism.

Another object is to provide means whereby a work caliper is positioned by means of a hand wheel operated limit switch.

Another object is to provide means whereby an incremental feed mechanism is actuated to provide a single increment to eliminate backlash before the increment feed begins repetitive operation.

Another object is to provide means operating in timed relation with the dwell period and feed increments for preventing drift of the wheel support beyond the point to which it is intended to stop.

Another object is to provide means for resetting the feed mechanism if a workpiece is not in position to be ground.

FIG. 2 is an end elevation of the work driver.

FIG. 3 is a partial sectional end elevation of the sizing caliper.

FIG. 4 is a hydraulic and electric circuit diagram.

Figure 1:
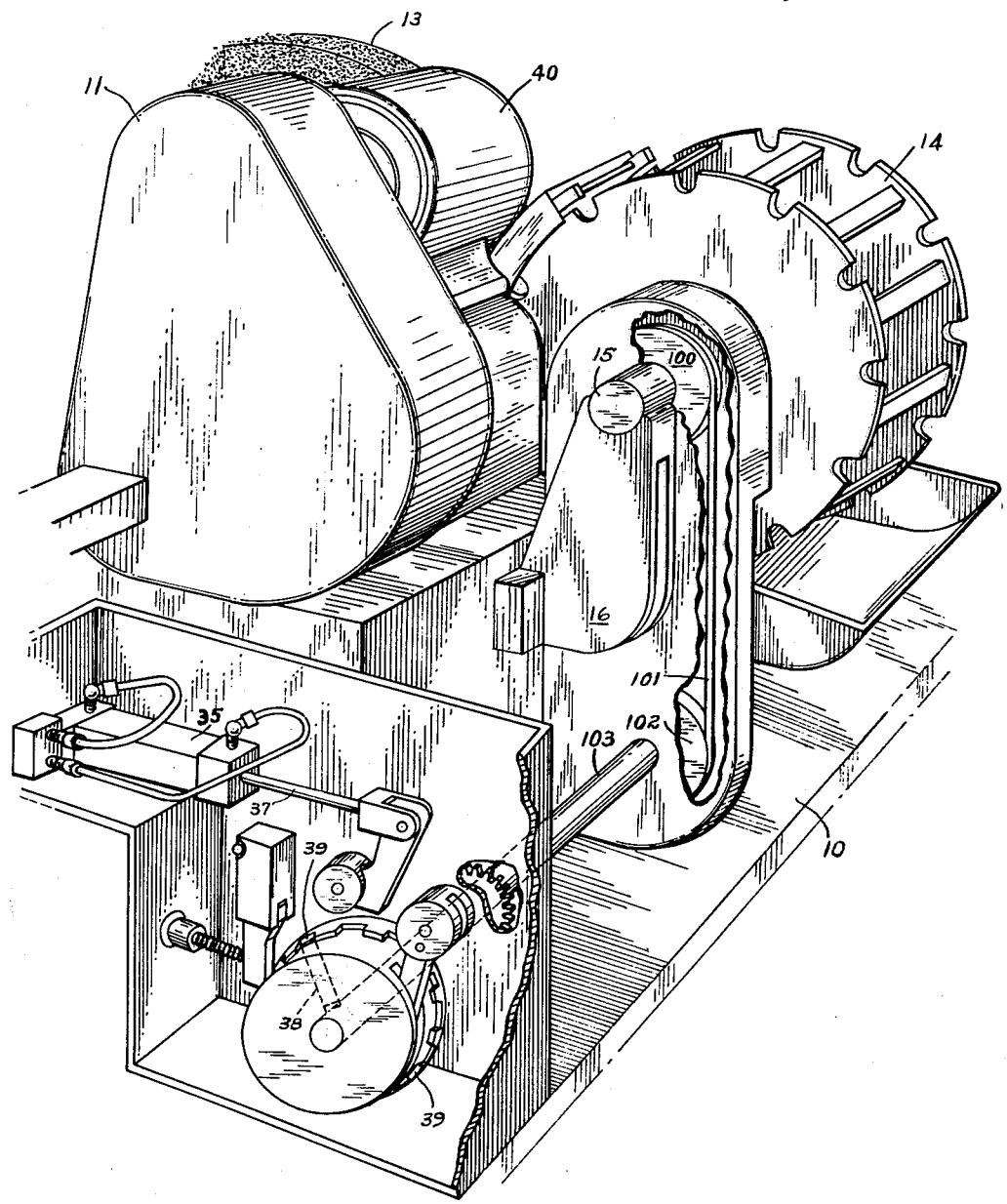
FIG. 1 is a left hand perspective view of a plunge grinding machine, particularly the work indexing mechanism.

The structural features of a plunge grinding machine are shown in my co-pending application, Serial No. 833,242, filed August 12, 1959. Reference may be made to said co-pending application for additional information on said structural features, although some of these features are described in the present application.

The base of the machine is indicated by numeral 10. Headstock 11 is driven by motor 40 and supported on base 10. Grinding wheel 13 is mounted on base 10 for movement toward and from workpieces W presented by carrier 14. Carrier 14 is mounted on shaft 15 which is supported on bracket 16 attached to base 10.

A pulley or sprocket 100 on shaft 15 is connected through a chain or belt 101 to a pulley or sprocket 102 on index shaft 103. Index shaft 103 is actuated by an index mechanism shown and described in said co-pending application. The index mechanism is actuated by an index cylinder 35 connected to piston rod 37 as shown and described in said co-pending application. For the purpose of this description, index plunger 38 and notches 39 serve as a ratchet mechanism. Gauge member 80 is attached to a pair of pistons 87 in cylinders 86. Cylinders 86 are attached to bracket 17 clamped to carrier shaft 15.

The means for rotating workpieces W includes a face plate 120 having oppositely positioned driving dogs 121 and 122 rotatable with face plate 120 and arranged to engage the corners 123 of flange 124 of workpiece W. Face plate 120 moves first at a slow rate in a reverse or clockwise direction in the event that the corners of a workpiece prevent endwise movement of the workpiece into proper driving relation with dogs 121 and 122. The reverse movement carries said dogs to one side of the corner 123 of flange 124 of workpiece W so that workpiece W may be moved endwise into the path of dogs 121 and 122. Face plate 120 is then reversed and dogs 121 and 122 engage the corners 123 of flange 124 of workpiece W to rotate it for a grinding operation.

Operation

The machine is prepared for operation by closing the circuit through the start switch button and completing the circuit through the stop switch button to energize machine start relay CRM. Machine start relay contact CRM1 closes a circuit which makes current available at various limit switches and relays, although no circuits are completed at this time except that from line L1 to control relay 7CR through control relay contact CRM1, control relay contact 3CR1, limit switches 8LS and 9LS, and control relay contacts 8CR1 and 6CR1.

Control relay contact 7CR2 completes a circuit to valve solenoid 4, shifting footstock pilot valve 20 to the right and directing fluid to the right hand end of pressure operated footstock valve 21 which directs fluid under pressure to the rod end of footstock cylinder 22, shifting piston 23 to retract footstock center 24.

A 7CR contact (not shown) actuates an ejector (not shown) which, in turn, actuates limit switch 2LS, closing limit switch contact 2LS1 to energize control relay 1CR. Control relay contact 1CR1 holds the circuit from relay contact 7CR1 to relay 1CR. A normally closed contact of relay 1CR (not shown) opens to reset the ejector (not shown). This is mentioned only to describe a starting point for the grinding cycle, for example, a means to actuate limit switch 2LS.

Resetting the ejector (not shown) opens limit switch contact 2LS1 and closes limit switch contact 2LS2. Retraction of footstock center 24 closes limit switch 3LS to complete a circuit through relay contact 1CR2 and limit switch contact 2LS2 to energize relay 2CR.

Closing relay 2CR completes a circuit through relay contact 2CR1 to energize valve solenoid 2. Valve solenoid 2 shifts index pilot valve 30 to the right, directing fluid under pressure to the right hand end of indexer valve 31, shifting said valve to the left and directing fluid to the head end of indexer cylinder 35, shifting indexer piston 36 to actuate the index mechanism.

Operation of the index mechanism includes withdrawing indexer plunger 38 to open limit switch contact 6LS1 and close limit switch contact 6LS2. Closing limit switch contact 6LS2 energizes relay 4CR. Relay 4CR is held through relay contact 4CR2.

At the end of the index movement when plunger 38 drops back in notch 39, limit switch contact 6LS1 closes and limit switch contact 6LS2 opens. Relay 4CR has been held through limit switch 3LS and relay contacts 1CR2 and 4CR2.

Limit switch contact 6LS1 completes a circuit through relay contact 4CR1 to energize relay 3CR and relay 11TR.

Normally closed relay contact 3CR1 opens to break the circuit through limit switch contact 8LS1 and normally closed relay contacts 8CR1 and 6CR1 to deenergize relay 7CR and deenergize valve solenoid 4.

After a predetermined interval to permit the completion of the index movement, timer relay contact 11TR1 closes to complete a circuit through normally closed relay contact 7CR3 to energize relay 6CR.

Control relay contact 6CR2 completes a circuit to energize footstock advance valve solenoid 3, shifting footstock pilot valve 20 to the left to direct fluid under pressure to the left end of footstock valve 21 and direct fluid under pressure to the head end of footstock cylinder 22 to shift piston 23 and footstock center 24 to the left to engage a workpiece.

If the workpiece is short, arm 25 on footstock center 24 will actuate limit switch contact 4LS2 to complete a circuit through normally closed relay contacts 5CR2, 29CR2 and 5MF4 to energize headstock motor relays 5MR and through relay contacts 29CR3 and 5MH6 to energize headstock motor relay 5ML.

Opening limit switch contact 4LS1 at this point prevents operation of the indexer while footstock center 24 is in work engaging position. The other function of limit switch contact 4LS1 is to make sure that the footstock is retracted before the indexer is actuated.

Relays 5MR and 5ML are energized to complete a circuit through relay contact 5MR1 and other relay contacts 5MR2, 5MR3, 5ML1, 5ML2 and 5ML3 to start rotation of headstock motor 40 at slow speed in a reverse direction.

If dogs 121 and 122 on face plate 120 are not in proper position relative to flange 124 on workpiece W, they will be backed away from the point of contact on the corners 123 of flange 124 so that endwise movement of workpiece W against headstock center 12 may be completed. By reversing instead of moving forward, dogs 121 and 122 move only enough to clear the corners 123 of flange 124 to be in driving position.

Limit switch contact 4LS2 and control relay contact 5CR2 also complete a circuit through relay contact 19CR2 to energize timer relay 2TR.

Timer relay 2TR times closed after an interval sufficient to allow dogs 121 and 122 to back away from any improper contact with flange 124 of workpiece W. When relay 2TR times out, timer relay contact 2TR1 completes a circuit to relay 29CR. Relay contact 29CR1 completes a circuit through normally closed relay contact 30CR2 to energize relay 5MH and thus starting the energize relay 5MH. Relay contact 29CR2 opens to open a circuit through relay contact 5MF4 to deenergize relay 5MR.

Control relay contact 29CR3 opens to open a circuit through relay contact 5MH6 to deenergize relay 5ML, thus stopping the slow speed reverse movement and transferring the motor circuit to relays 5MF and 5MH to rotate the work in a forward direction at high speed. Relay contacts 5MF1, 5MF2 and 5MF3 close to complete a circuit through relay contacts 5MH5, 5MH4 and 5MH3 to headstock motor 40.

Normally closed relay contact 5MR4 completes a circuit from relay contact 29CR1 to energize relay 5MF. Normally closed relay contact 5ML4 completes a circuit from relay contact 29CR1 and normally closed relay contact 30CRS to energize relay 5MH and thus starting the high speed forward movement.

Control relay contact 6CR3 is a holding circuit from relay contact 8CR2 or relay contact 19CR1 through relay contact 7CR3 for relay 6CR.

If the workpiece W is long, it will actuate limit switch 7LS as it moves into alignment with footstock center 24. Arm 25 will actuate limit switch 5LS to start the work.

Limit switch 7LS completes a circuit to energize relay 5CR, closing relay contacts 5CR1, 5CR3 and 5CR4, and opening relay contacts 5CR2 and 5CR3.

Relay contact 5CR5 opens and renders limit switch contact 5LS1 ineffective. Relay contact 5CR4 closes and transfers the circuit for performing the same function through limit switch 5LS in parallel with limit switch contact 4LS2. Limit switch 5LS has another contact (not shown) corresponding to limit switch contact 4LS2. A description of the function of limit switch contact 4LS2 will apply equally to that of limit switch contact 5LS2.

The function of limit switch 5LS and limit switch contact 4LS1 is to co-ordinate the functions of the footstock and the indexer so that one will not interfere with the other. The function of limit switch contact 4LS2 and the corresponding 5LS contact (not shown) is to start the motor 40 after the footstock has engaged workpiece W.

The position of limit switch 5LS is such that the function previously performed by the operation of limit switch contact 4LS2, occurs at an earlier point in the movement of footstock center 24 when the length of the work prevents footstock center 24 from moving far enough to actuate limit switch contact 4LS2. Thus, limit switch 7LS determines whether motor 40 will be started by limit switch contact 4LS2 or limit switch 5LS.

Relay contact 5MF5 completes a circuit to energize relay 8CR. Relay contact 5MF6 completes a circuit through relay contacts 8CR4 and 12CR1 to energize infeed relay 10CR. Relay contact 10CR1 provides a holding circuit around relay contact 5MF6.

Control relay contact 10CR3 completes a circuit to energize infeed valve solenoid 6, shifting infeed pilot valve 50 to the right to direct fluid under pressure to the right hand end of infeed valve 51, shifting said valve to the left. In this position, valve 51 directs fluid under pressure to the head end of rapid feed cylinder 52, shifting rapid feed piston 53 and feed screw 54 along with wheelbase 83 in which vertical shaft 55 and gear 75 provides an operable connection between feed hand wheel 56 and feed screw 54 in which the teeth of gear 75 engage the threads of feed screw 54.

The above described function, namely, the operation of footstock center 24 to engage workpiece W, the starting of motor 40 and the actuation of the wheel feed, all occur in response to the closing of limit switch contact 6LS1 at the end of the index movement. The index movement, therefore, must be completed before the remainder of the cycle can take place.

Feed screw 54 actuated by piston 53 advances along with wheelbase 83 until said feed screw engages positive stop 69. As wheelbase 83 moves forward, limit switch 12LS is opened, deenergizing relay 19CR and closing relay contacts 19CR1 and 19CR2.

During the rapid feed movement, exhaust pressure from the rod end of rapid feed cylinder 52 is directed to the left end of pressure operated valve 60 to hold said valve in right hand position and prevent the passage through said valve 60 of fluid under pressure to the head end of slow feed cylinder 61. When rapid feed piston 53 stops its advance movement, the exhaust pressure immediately drops and valve 60 is shifted to the left to direct fluid under pressure to the head end of slow feed cylinder 61. Slow feed piston 62 actuates rack 63 and pinion 64 on hand wheel shaft 65 to rotate vertical shaft 55 and move wheelbase 83 in which it is mounted along feed screw 54. As hand wheel 56 rotates, cam 57 actuates limit switch 11LS to complete circuits to energize relays 30CR and 13CR. Relay 13CR is held through relay contact 13CR2.

Relay contact 13CR3 completes a circuit to energize valve solenoid 7 to advance gage 80 into operative contact with workpiece W. Relay contact 13CR1 completes a circuit from relay contact 10CR2 to serve as an additional holding circut for relay 13CR.

Relay contact 30CR2 which is normally closed, opens to deenergize relay 5MH to stop the high speed rotation of motor 40. Relay contact 30CR1 closes to complete a circuit through relay contact 5MH6 to energize relay 5ML, closing relay contacts 5ML1, 5ML2 and 5ML3 to complete a circuit from relay contacts 5MF1, 5MF2 and 5MF3 to rotate motor 40 at slow speed forward.

Normally closed relay contact 5ML4 opens to further open the circuit to relay 5MH.

When gage 80 advances to contact workpiece W, limit switch contact 8LS1 opens and limit switch contact 8LS2 closes. Limit switch contact 8LS2 completes a circuit to energize relay 33CR. Hand wheel 56 continues to rotate until piston 62 reaches the end of its stroke and at the same time, cam 58 actuates limit switch 10LS to complete a circuit through relay contact 33CR1 to energize timer relay 4TR. Relay 4TR times closed after a predetermined sparkout interval to start the increment feed.

Another circuit from relay contact 33CR1 through normally closed relay contact 16CR2 is completed to relay 15CR. However, another circuit from relay contact 33CR1 through normally closed relay contact 14CR1 energizes relay 16CR and opens relay contact 16CR2 to prevent energizing relay 15CR.

Thus, retard valve solenoid 8 remains deenergized and valve 70 remains in the right hand position and retard cylinder 85 is disconnected from valve 70 to prevent further movement of wheelbase 83.

Control relay contact 16CR1 completes a circuit to ratchet feed valve solenoid 9 to shift feed valve 90 to the left and direct fluid under pressure to the left end of ratchet feed cylinder 91 to move piston 92 to the right. Pawl 93 attached to piston rod 94 engages and rotates ratchet 95 to turn feed screw 54 for a single feed increment to take up lost motion and wind-up in the feed mechanism. If the total lost motion and wind-up is less than the amount of the feed increment, there will also be a slight movement of wheelbase 83. The extent of this movement will be limited by retard piston 81.

Control relay contact 33CR1 also completes a circuit through normally closed relay contact 14CR1 to energize timer relay 6TR. Timer relay 6TR closes immediately to energize timer relay 5TR. Relay contact 5TR1 times closed to energize relay 14CR, opening relay contact 14CR1 in the circuit to relays 6TR and 16CR. Relay 16CR opens relay contact 16CR1, deenergizing valve solenoid 9 and resetting ratchet feed valve 90 for the next stroke. Relay contact 16CR2 closes, energizing relay 15CR and shifting retard valve 70 to connect retard cylinder 85 with exhaust. After a predetermined interval, relay contact 4TR1 times closed.

When relay 6TR times open, relay contact 5TR1 in the circuit to relay 14CR opens and relay contact 5TR2 in the circuit with relay contact 4TR1 closes so that relays 6TR and 16CR are again energized to provide a feed increment, and relay 15CR is deenergized to actuate retard valve 70 to prevent movement of wheelbase 83 beyond the amount intended by said increment.

This inter-action between the microfeed and retard mechanisms continues until the sizing device gage contact G energizes relay 12CR. Opening normally closed relay contact 12CR1 deenergizes infeed relay 10CR. Relay contact 10CR3 opens, deenergizing valve solenoid 6 and infeed pilot valve 50 is shifted to the left directing fluid to shift infeed valve 51 to the right.

In this position, valve 51 directs fluid under pressure to the rod end of rapid feed cylinder 52, shifting piston 53 along with wheelbase 83 to the right. After wheelbase 83 has moved a predetermined distance, piston 53 uncovers a port 59 which conducts fluid under pressure to the rod end of slow feed cylinder 61, shifting piston 62 downwardly to reset the slow feed mechanism.

When wheelbase 83 is retracted, it actuates limit switch 12LS when wheel 13 has moved a predetermined distance away from the work. Limit switch 12LS completes a circuit to energize relay 19CR. Relay contact 19CR1 closes in the circuit to relay 6CR to open relay contact 6CR2 to deenergize footstock valve solenoid 3. Relay contact 19CR2 opens to deenergize relay 2TR. Timer 2TR opens the circuit to relay 29CR to stop rotation of headstock motor 40 from high speed to low speed. When wheelbase 83 reaches retracted position, limit switch 9LS is closed.

When hand wheel 56 is reset by piston 62, limit switch 11LS is opened to deenergize relay 13CR. Relay contact 13CR3 opens to deenergize air valve solenoid 7 to retract gage 80. Retracting gage 80 closes limit switch 8LS in the circuit with limit switch 9LS, normally closed relay contact 6CR1 and relay 7CR.

Stopping headstock motor 40 and deenergizing footstock valve solenoid 3 involves deenergizing relays 6CR and 8CR and closing normally closed relay contacts 6CR1 and 8CR1 in the circuit to relay 7CR. Normally closed relay contact 7CR3 opens to deenergize relay 6CR. Opening relay contact 6CR2 deenergizes footstock valve solenoid 3. Relay contact 7CR2 energizes footstock retract valve solenoid 4 to retract footstock center 24 to the right.

Means is provided whereby the grinding cycle will be stopped and the parts returned to retracted position if the work carrier indexes an empty work station to the grinding position. The means for accomplishing this objective is based on the functioning of gage 80.

During the slow feed movement, feed hand wheel 56 is rotated by piston 62 through a predetermined distance dependent on the length of cylinder 61. During this movement, limit switches 11LS and 10LS are actuated. Limit switch 11LS is closed by cam 57 to energize gage advance relay 13CR and air valve solenoid 7 to direct air to the two gage operating cylinders 86 to move gage 80 into work engaging position.

If there is an unground workpiece in position for grinding, it will hold sizing device gage contact G open. However, sizing device gage contact G is not energized until cam 58 on hand wheel 56 actuates limit switch 10LS. Relay 14CR is not necessarily energized at this time.

Limit switch 10LS provides current for sizing device gage contact G in the circuit to relay 11CR so that when a workpiece is ground to size, relay 11CR will be energized. Relay contact 11CR1 will complete a circuit to energize relay 12CR. Normally closed relay contact 12CR1 in the circuit to relay 10CR will open, deenergizing relay 10CR. Relay contact 10CR3 opens to deenergize infeed valve solenoid 6.

Infeed pilot valve 50 is shifted to the left to direct fluid under pressure to the left end of infeed valve 51, shifting said valve to the right and directing fluid under pressure to the rod end of rapid feed cylinder 52 to retract wheelbase 83.

When wheelbase 83 reaches retracted position, limit switch 12LS operates in response to the drop in pressure in the exhaust fluid from rapid feed cylinder 52 to close a circuit through normally closed relay 7TR to energize relay 8TR. Relay 8TR closes after a predetermined interval to energize ratchet feed reset relay 20CR.

Relay 20CR energizes valve solenoid 11 and a pressure operated pawl 96 to reverse ratchet 95 by a predetermined amount.

When gage 80 is advanced by limit switch 11LS, the absence of workpiece W will affect said gage the same as a workpiece that has been ground to size and sizing device gage contact G will remain closed and return wheelbase 83 to starting position.

When cam 58 on hand wheel 56 closes limit switch 10LS, relay 14CR will be energized immediately since sizing device gage contact G will already be closed and wheel 13 and wheelbase 83 will be reset as described above.

I claim:

1. In a machine tool, a bed, means for rotatably supporting a workpiece on said bed comprising spaced extended portions on the front of said bed, a headstock mounted on one of said portions and a footstock mounted on the other of said portions, a work carrier rotatably supported between said extended portions for presenting successive workpieces to be supported by said headstock and said footstock, means for actuating said headstock and footstock to engage and support a workpiece, a tool support slidably mounted on said bed for movement toward and from a workpiece carried by said headstock and footstock, means for indexing said work carrier comprising a shaft for driving said work carrier; a drum rotatable on said shaft, a notched ring rotatable with said shaft relative to the peripheral surface of said drum, a retractable pin in said drum for engaging said notches to lock said notched ring and said drum together, means for rotating said notched ring, said drum, and said work carrier, a resiliently actuated pawl for centering said notched ring and removing said pin therefrom whereby to permit said notched ring to return to starting position and said pin to enter the next notch, and means to prevent the return of said tool support toward said workpiece until after said indexing means has turned said work carrier to place another workpiece in position for machining.

2. In a grinding machine, a bed, means on said bed for rotatably supporting a workpiece, a grinding wheel support, a grinding wheel rotatably mounted thereon, means for moving said grinding wheel support rapidly toward said workpiece supporting means to position said grinding wheel for a grinding operation including a piston and cylinder, means for supply fluid under pressure to said cylinder, slow feed means for feeding said grinding wheel at a slow rate for a grinding operation, and means for actuating said slow feed means at the end of said positioning movement including control means operable in response to the drop in exhaust pressure from said cylinder at the end of said positioning movement.

3. In a grinding machine having means for supporting a workpiece, a grinding wheel support, a grinding wheel rotatably mounted on said grinding wheel support, a feed mechanism for moving said grinding wheel support toward and from said work support comprising a feed screw and a thread engaging member in operative relation with said feed screw, continuous moving means operable between predetermined limits for actuating said thread engaging member to move said grinding wheel support relative to said feed screw for a preliminary grinding operation, a ratchet mechanism connected to said feed screw independently of said continuous moving means and means operable by said continuous moving means at the end of its movement for starting said ratchet mechanism to resume operation of said feed mechanism by rotating said feed screw by increments, a sizing device, and means actuated thereby each time a workpiece is ground to size for reversing said ratchet mechanism by substantially the same amount from the point to which said ratchet mechanism has advanced.

4. In a grinding machine having means for supporting a workpiece, a grinding wheel support, a grinding wheel rotatably mounted on said grinding wheel support, a feed mechanism for moving said grinding wheel support toward and from said work support comprising a feed screw and a thread engaging member in operative relation with said feed screw, continuous moving means operable between predetermined limits for effecting a preliminary grinding operation, means for resisting movement of said grinding wheel support toward said work support, means operable when said continuous moving means reaches the end of its movement for actuating said resisting means to prevent drifting of said grinding wheel support after said continuous moving means has stopped, a ratchet mechanism operable after said continuous moving means has stopped to actuate said feed mechanism by increments, and means operable in timed relation with said increments for actuating said resisting means to prevent movement of said grinding wheel support in excess of the amount intended by said increments.

5. In a grinding machine having means for supporting a workpiece, a grinding wheel support, a grinding wheel rotatably mounted on said grinding wheel support, a feed mechanism for moving said grinding wheel support toward and from said work support comprising a feed screw and a thread engaging member in operative relation with said feed screw, continuous moving means operable between predetermined limits for effecting a preliminary grinding operation, means for resisting movement of said grinding wheel support toward said work support, a ratchet mechanism operable after said continuous moving means has stopped to actuate said feed mechanism by increments, and means operable in timed relation with said increments for actuating said resisting means to prevent movement of said grinding wheel support in excess of the amount intended by said increments.

6. In a grinding machine for automatically grinding workpieces, a work support and a wheel support, means for rotatably supporting a grinding wheel on said wheel support, means for rotatably supporting a workpiece on said work support, means for automatically presenting workpieces to said work support, means for feeding said grinding wheel toward and from said work support, a size control apparatus for withdrawing said grinding wheel when a workpiece has been ground to a predetermined size, means operable when said grinding wheel has advanced to a predetermined position, to apply said size control apparatus to a workpiece, said size control apparatus being operable in the absence of a workpiece to cause withdrawal of said wheel support and actuation of said work presenting means to advance to the next work presenting position.

7. In a grinding machine for automatically grinding workpieces, a work support and a wheel support, means for rotatably supporting a grinding wheel on said wheel support, means for rotatably supporting a workpiece on said work support, means for automatically presenting workpieces to said work support, a feed mechanism for feeding said grinding wheel toward and from said work support, a size control apparatus for withdrawing said grinding wheel when a workpiece has been ground to a predetermined size, means operable when said feed mechanism has advanced to a predetermined position to apply said size control apparatus to a workpiece, said size control apparatus being operable in the absence of a workpiece to cause withdrawal of said wheel support and actuation of said work presenting means to advance to the next work presenting position.

8. In a grinding machine, a bed, means on said bed for rotatably supporting a workpiece including a headstock and a footstock, each having centers for supporting said workpiece, means on said headstock for rotating said workpiece, means for advancing and retracting said footstock center to engage and dis-engage a workpiece, axially spaced control members on said footstock for starting and stopping said work rotating means and adaptable to be actuated by the movement of said footstock center, one of said control members being operable when the footstock center engages short workpieces, the other of said control members being operable when the footstock center engages long workpieces.

9. A grinding machine as described in claim 8 having a work carrier for intermittently presenting workpieces to be ground, means operable by said work carrier for actuating said footstock to engage a workpiece, and means actuated by said footstock when a workpiece has been engaged to start said work rotating means.

10. A grinding machine as described in claim 8 having a work carrier for intermittently presenting workpieces to be ground, a work ejector reset switch operable in response to resetting an ejector, and means actuated thereby for causing movement of said work carrier to place a workpiece in position to be ground.

11. In a machine tool, means for rotatably supporting a workpiece comprising a headstock and a footstock, driving means on said headstock for engaging a portion of said workpiece, a motor for rotating said driving means, control means for said motor to drive said motor forward or reverse and at low speed or high speed, motor starting means operable to actuate said low speed and reverse control means to start said driving means in reverse direction and at slow speed in order to position said driving means in driving relation to said workpiece, a timing device actuated by said starting means and operable after a predetermined interval to deenergize said slow speed and reverse control means and energize said fast speed and forward control means to drive said workpiece forward and at high speed for a machining operation.

12. In a grinding machine, a work support, means for rotatably supporting a workpiece on said work support, means for rotating said workpiece comprising a motor, control means for starting and stopping said motor, a grinding wheel support movable toward and from said work support and means for effecting said movement, a grinding wheel rotatably mounted on said grinding wheel support, and means operable in response to operation of said motor control means to start said work rotating motor to actuate said wheel support moving means.

13. In a grinding machine, a bed, a work support, a grinding wheel support slidably mounted on said bed for movement toward and from said work support, means for effecting movement of said grinding wheel support comprising a feed mechanism, a hand wheel for actuating said feed mechanism, power means for rotating said hand wheel, a limit switch and means on said hand wheel for actuating said limit switch, a caliper and means for moving said caliper toward and from said workpiece, and means actuated by said limit switch for actuating said caliper moving means.

14. A grinding machine including a work support, means for rotatably supporting a workpiece on said work support, a motor for rotating said workpiece, control means for actuating said motor at different speeds, a grinding wheel support slidably mounted on said grinding machine, means for moving said grinding wheel support toward and from said work support comprising a feed mechanism, a hand wheel for actuating said feed mechanism, a limit switch and means on said hand wheel for actuating said limit switch, and connections between said limit switch and said motor control means for changing said motor speed at a predetermined point in the movement of said grinding wheel support.

15. In a grinding machine, a bed, a work support, a grinding wheel support slidably mounted on said bed for movement toward and from said work support, means for effecting movement of said grinding wheel support comprising a feed mechanism, power means for actuating said feed mechanism for a rough grinding operation, a ratchet mechanism for actuating said feed mechanism for a finish grinding operation, a limit switch actuated by said power means at a predetermined point in said grinding operation to stop said rough grinding feed, and means also actuated by said limit switch to start said ratchet means to actuate said feed mechanism for a finish grinding operation.

16. A grinding machine having a work support, means for rotatably supporting a work piece on said work support, a grinding wheel support slidably mounted for movement toward and from said work support, means for effecting movement of said grinding wheel support comprising a feed mechanism, power means for effecting a continuous movement of said feed mechanism, a ratchet mechanism for effecting incremental operation of said feed mechanism, a limit switch operable during said continuous operation of said feed mechanism for stopping said feed mechanism and for actuating said ratchet mechanism to actuate said feed mechanism by a single increment to take up backlash and the like in said feed mechanism and thereafter to provide a succession of feed increments until a workpiece has been ground to size.

17. A grinding machine having a work support, means for rotatably supporting a workpiece on said work support, a grinding wheel support slidably mounted for movement toward and from said work support, means for effecting movement of said grinding wheel support comprising a feed mechanism, power means for effecting a continuous movement of said feed mechanism, a ratchet mechanism for effecting incremental operation of said feed mechanism, a limit switch operable during said continuous operation of said feed mechanism for stopping said feed mechanism and for actuating said ratchet mechanism to actuate said feed mechanism by a single increment to take up backlash and the like in said feed mechanism, a timing device actuated by said limit switch and operable after a predetermined interval to cause said ratchet mechanism to resume operation to effect a succession of feed increments until a workpiece has been ground to size.

18. In a grinding machine for automatically grinding workpieces, a work support and a wheel support, means for rotatably supporting a grinding wheel on said wheel support, means for rotatably supporting a workpiece on said work support, means for automatically presenting workpieces to said work support, means for feeding said grinding wheel toward and from said work support, and means operable when said grinding wheel has advanced to a predetermined position in the absence of a workpiece to cause withdrawal of said wheel support.

19. In a grinding machine for automatically grinding workpieces, a work support and a wheel support, means for rotatably supporting a grinding wheel on said wheel support, means for rotatably supporting a workpiece on said work support, means for automatically presenting workpieces to said work support, means for feeding said grinding wheel toward and from said work support for a grinding operation, a size control apparatus for withdrawing said grinding wheel when a workpiece has been ground to a predetermined size, means operable by said size control apparatus and said wheel feed means in the absence of a workpiece to cause withdrawal of said wheel support and actuation of said work presenting means to advance to the next work presenting position.

20. In a grinding machine, a bed, a work support on said bed, a grinding wheel support mounted on said bed for movement toward and from said work support, a grinding wheel rotatably mounted on said grinding wheel support, means for feeding said grinding wheel support including a feed screw in said bed and screw engaging means in said grinding wheel support, a continuous moving means operable between predetermined limits for actuating said screw engaging means to move said grinding wheel support relative to said feed screw for a fast grinding operation, means for rotating said feed screw including an increment feed means, power operated means for actuating said increment feed means in one direction for operating said feed screw to feed said grinding wheel during a finish grinding operation, a sizing device, and means actuated by said sizing device for actuating said increment feed means in the opposite direction after each grinding cycle by a fixed amount from the point to which said increment feed means and said feed screw have advanced.

21. In a grinding machine having a work support, a grinding wheel support, a grinding wheel rotatably mounted on said wheel support, a feed mechanism for moving said wheel support toward and from said work support comprising a feed screw and a thread engaging member in operative relation with said feed screw, continuous moving means operable between predetermined limits for effecting a preliminatry grinding operation, means for resisting movement of said wheel support toward said work support, a limit switch operable by said continuous moving means near the end of its movement for actuating said resisting means to prevent drifting of said wheel support after said continuous moving means has stopped.

22. In a grinding machine having a work support, a grinding wheel support, a grinding wheel rotatably mounted on said wheel support, a feed mechanism for moving said wheel support toward and from said work support comprising a feed screw and a thread engaging member in operative relation with said feed screw, continuous moving means operable between predetermined limits for effecting a preliminary grinding operation, means for resisting movement of said wheel support toward said work support comprising a piston and cylinder, one of which moves with said wheel support to discharge fluid from said cylinder, and means including a valve operable when said continuous moving means approaches the end of its movement for preventing discharge of fluid from said cylinder.

23. In a grinding machine having a work support, a grinding wheel support, a grinding wheel rotatably mounted on said wheel support, a feed mechanism for moving said wheel support toward and from said work support comprising a feed screw and a thread engaging member in operative relation with said feed screw, continuous moving means operable between predetermined limits for effecting a preliminary grinding operation, means for resisting movement of said grinding wheel support toward said work support, means operable when said continuous moving means reaches the end of its movement for actuating said resisting means to prevent drifting of said wheel support after said continuous moving means has stopped.

References Cited in the file of this patent
UNITED STATES PATENTS

| | | |
|---|---|---|
| 1,815,049 | Cole | July 21, 1931 |
| 2,758,426 | Comstock | Aug. 14, 1956 |